United States Patent
Ito et al.

(10) Patent No.: US 8,603,369 B2
(45) Date of Patent: Dec. 10, 2013

(54) POSITIVE ELECTRODE MATERIAL FOR ELECTRICAL DEVICE, AND ELECTRICAL DEVICE PRODUCED USING SAME

(75) Inventors: Atsushi Ito, Ebina (JP); Yasuhiko Ohsawa, Yokosuka (JP); Yuichi Sato, Yokohama (JP)

(73) Assignees: Nissan Motor Co., Ltd., Yokohama-shi (JP); Kanagawa University, Yokohama-shi (JP)

( * ) Notice: Subject to any disclaimer, the term of this patent is extended or adjusted under 35 U.S.C. 154(b) by 0 days.

(21) Appl. No.: 13/513,051

(22) PCT Filed: Dec. 2, 2010

(86) PCT No.: PCT/JP2010/071610
§ 371 (c)(1),
(2), (4) Date: May 31, 2012

(87) PCT Pub. No.: WO2011/068172
PCT Pub. Date: Jun. 9, 2011

(65) Prior Publication Data
US 2012/0228544 A1    Sep. 13, 2012

(30) Foreign Application Priority Data
Dec. 4, 2009 (JP) ............................. 2009-276808

(51) Int. Cl.
| | |
|---|---|
| *H01B 1/02* | (2006.01) |
| *H01M 4/131* | (2010.01) |
| *H01M 4/134* | (2010.01) |
| *H01M 4/02* | (2006.01) |
| *H01M 4/42* | (2006.01) |
| *H01M 4/50* | (2010.01) |
| *H01M 4/52* | (2010.01) |
| *H01M 4/505* | (2010.01) |
| *H01M 4/525* | (2010.01) |

(52) U.S. Cl.
USPC ............... 252/521.2; 252/519.15; 429/223; 429/224; 429/218.1

(58) Field of Classification Search
USPC ........ 252/519.15, 521.2; 429/223, 224, 218.1
See application file for complete search history.

(56) References Cited

U.S. PATENT DOCUMENTS

| 6,416,905 B1 | 7/2002 | Bronstert et al. |
| 6,613,478 B2 * | 9/2003 | Munakata et al. ........ 429/231.95 |
| 6,623,890 B2 * | 9/2003 | Munakata et al. ........ 429/231.95 |

(Continued)

FOREIGN PATENT DOCUMENTS

| JP | 9-55211 A | 2/1997 |
| JP | 2007-503102 A | 2/2007 |

(Continued)

OTHER PUBLICATIONS

K. Park et al., "Design and analysis of triangle phase diagram for preparation of new lithium manganese oxide solid solutions with stable layered crystal structure", *Journal of Power Science*, vol. 146, (2005), pp. 281-286.

*Primary Examiner* — Joseph D Anthony
(74) *Attorney, Agent, or Firm* — Foley & Lardner LLP

(57) ABSTRACT

[Problems to be Solved] Provided is a positive electrode material for an electrical device, which has high capacity and improved initial charge-discharge efficiency.
[Means for Solving the Problem] Disclosed is a positive electrode material for an electrical device, which is represented by the formula (1):

$$aLi[Li_{1/3}Mn_{2/3}]O_2 \cdot (1-a)Li[Ni_xCo_yMn_{1-x-y}]O_2 \quad (1)$$

(wherein, $0<a<1$, $0<x<0.5$, and $0<y<0.3$) and satisfies the relational expression: $2x+y<1$.

6 Claims, 7 Drawing Sheets

(56) References Cited

U.S. PATENT DOCUMENTS

| | | |
|---|---|---|
| 7,118,694 B2 | 10/2006 | Bronstert et al. |
| 2004/0234857 A1 | 11/2004 | Shiozaki et al. |
| 2006/0093921 A1* | 5/2006 | Scott et al. .................... 429/245 |
| 2006/0099508 A1 | 5/2006 | Thackeray et al. |
| 2007/0042269 A1 | 2/2007 | Chang et al. |
| 2007/0122703 A1 | 5/2007 | Whitfield et al. |
| 2007/0160906 A1 | 7/2007 | Tooyama et al. |
| 2008/0248391 A1* | 10/2008 | Wakasugi et al. ............. 429/223 |
| 2008/0261115 A1 | 10/2008 | Saito et al. |
| 2009/0087746 A1* | 4/2009 | Kang et al. ................... 429/219 |
| 2009/0127520 A1 | 5/2009 | Whitfield et al. |
| 2010/0009245 A1* | 1/2010 | Howard et al. ................ 429/61 |
| 2010/0233542 A1 | 9/2010 | Endo et al. |

FOREIGN PATENT DOCUMENTS

| | | |
|---|---|---|
| JP | 2007-184145 A | 7/2007 |
| JP | 2007-287445 A | 11/2007 |
| JP | 2008-251526 A | 10/2008 |
| JP | 2009-505367 A | 2/2009 |
| JP | 2009-152114 A | 7/2009 |
| JP | 2009-259505 A | 11/2009 |
| RU | 2 132 101 C1 | 6/1999 |
| RU | 2 213 395 C2 | 9/2003 |
| RU | 2 329 570 C2 | 7/2008 |
| WO | WO 03-044881 A1 | 5/2003 |

* cited by examiner

LiMO$_2$

Li$_2$MnO$_3$ (Li[Li$_{1/3}$Mn$_{2/3}$]O$_2$)

[Li$_{1/3}$Mn$_{2/3}$] LAYER

POSITIVE ELECTRODE MATERIAL FOR ELECTRICAL DEVICE, AND ELECTRICAL DEVICE PRODUCED USING SAME

TECHNICAL FIELD

The present invention relates to a positive electrode material for an electrical device and an electrical device using the same. More specifically, the invention relates to improvement for high capacity and enhanced energy density of an electrical device like a battery.

BACKGROUND ART

To cope with the problems caused by global warming, reducing the amount of carbon dioxide is desperately needed in recent days. The automobile industry focuses on introduction of an electric car or a hybrid car to reduce the carbon dioxide emission. In this connection, an electrical device like a battery for driving a motor, which is a key element for commercialization of such cars, is actively developed.

As the battery for driving a motor, a lithium ion battery having relatively high theoretical energy has been getting an attention and has been actively developed in these days. The lithium ion battery generally has a constitution that a positive electrode in which a positive active material or the like is coated on both surfaces of a positive electrode collector by using a binder, and a negative electrode in which a negative active material or the like is coated on both surfaces of a negative electrode collector by using a binder, are connected with intervened by an electrolyte layer, and they are stored in a battery case.

For widely commercializing electric cars having the lithium ion battery, it is necessary to develop the lithium ion battery with high performance. For an electric car, in particular, it is necessary that the driving mileage by a single charge should be close to the driving mileage per gasoline fill-up of a gasoline engine car, and therefore a battery with higher energy density is required. To increase the energy density of a battery, it is necessary to increase electric capacity per unit mass of the positive electrode and the negative electrode.

As the positive electrode material which may be useful for satisfying the requirements described above, a lithium manganese-based composite oxide having a layer structure was suggested. In particular, a solid solution of electrochemically inactive $Li_2MnO_3$ having a layer structure and electrochemically active $LiMO_2$ (M represents a transition metal including Co, Mn, and Ni or the like) having a layer structure is expected to be a candidate for the positive electrode material having high capacity which can exhibit high electric capacity of at least 200 mAh/g. In Patent Document 1, for example, $xLi[Mn_{1/2}N_{1/2}]O_2 \cdot yLiCoO_2 \cdot zLi[Li_{1/3}Mn_{2/3}]O_2$ (x+y+z=1, 0<x<1, 0≤y<0.5, and 0<z<1) is disclosed as a pseudoternary solid solution.

PRIOR ART DOCUMENT

Patent Document

Patent Document 1: Japanese Patent Application Laid-Open No. 2007-287445

DISCLOSURE OF INVENTION

Problem to be Solved by the Invention

However, inventors of the invention found that, when the pseudoternary solid solution described above is used as the positive electrode active material, irreversible capacity is huge and initial charge-discharge loss occurred. Specifically, when the pseudoternary solid solution described above is used as the positive electrode active material, a certain ratio (e.g., 20% or so) of the theoretical capacity that can be intrinsically exhibited is lost without being used for charge-discharge.

The electric capacity used for discharge after full charge (complete charge) is the same among each active material constituting each electrode active material layer of the lithium ion secondary battery. As such, even when each active material is used in an amount such that the same theoretical capacity is obtained, when initial charge-discharge loss occurs in the positive electrode active material, theoretical capacity of the negative electrode active material, which is the counterpart of the positive electrode active material, is not fully utilized at the time of discharge after full charge. As a result, the capacity corresponding to the initial charge-discharge loss of the positive electrode active material is wasted. This phenomenon is particularly significant when a material having extremely small initial charge-discharge loss is used as the negative electrode active material (e.g., graphite), and as a result, the energy density of a battery lowers.

Under the circumstances, object of the invention is to provide the positive electrode material for an electrical device, which has high capacity and improved initial charge-discharge efficiency.

Means for Solving Problem

Inventors of the invention carried out extensive studies to solve the problems described above. As a result, it was found that the problems can be solved by controlling the composition of M in a solid solution of electrochemically inactive $Li_2MnO_3$ having a layer structure and electrochemically active $LiMO_2$ having a layer structure, and the invention was completed accordingly.

Specifically, the invention relates to the positive electrode material for an electrical device, which is represented by the formula (1):

[Chemical Formula 1]

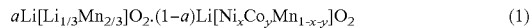
$$aLi[Li_{1/3}Mn_{2/3}]O_2 \cdot (1-a)Li[Ni_xCo_yMn_{1-x-y}]O_2 \qquad (1)$$

(wherein, 0<a<1, 0<x<0.5, and 0<y<0.3) and satisfies the relational expression: 2x+y<1.

Effects of the Invention

According to the positive electrode material for an electrical device of the invention, Li is easily released from a solid solution, and therefore initial irreversible capacity can be lowered. Further, the electrochemical reaction of a solid solution is activated then high capacity can be obtained.

MODE(S) FOR CARRYING OUT THE INVENTION

Figure 1:
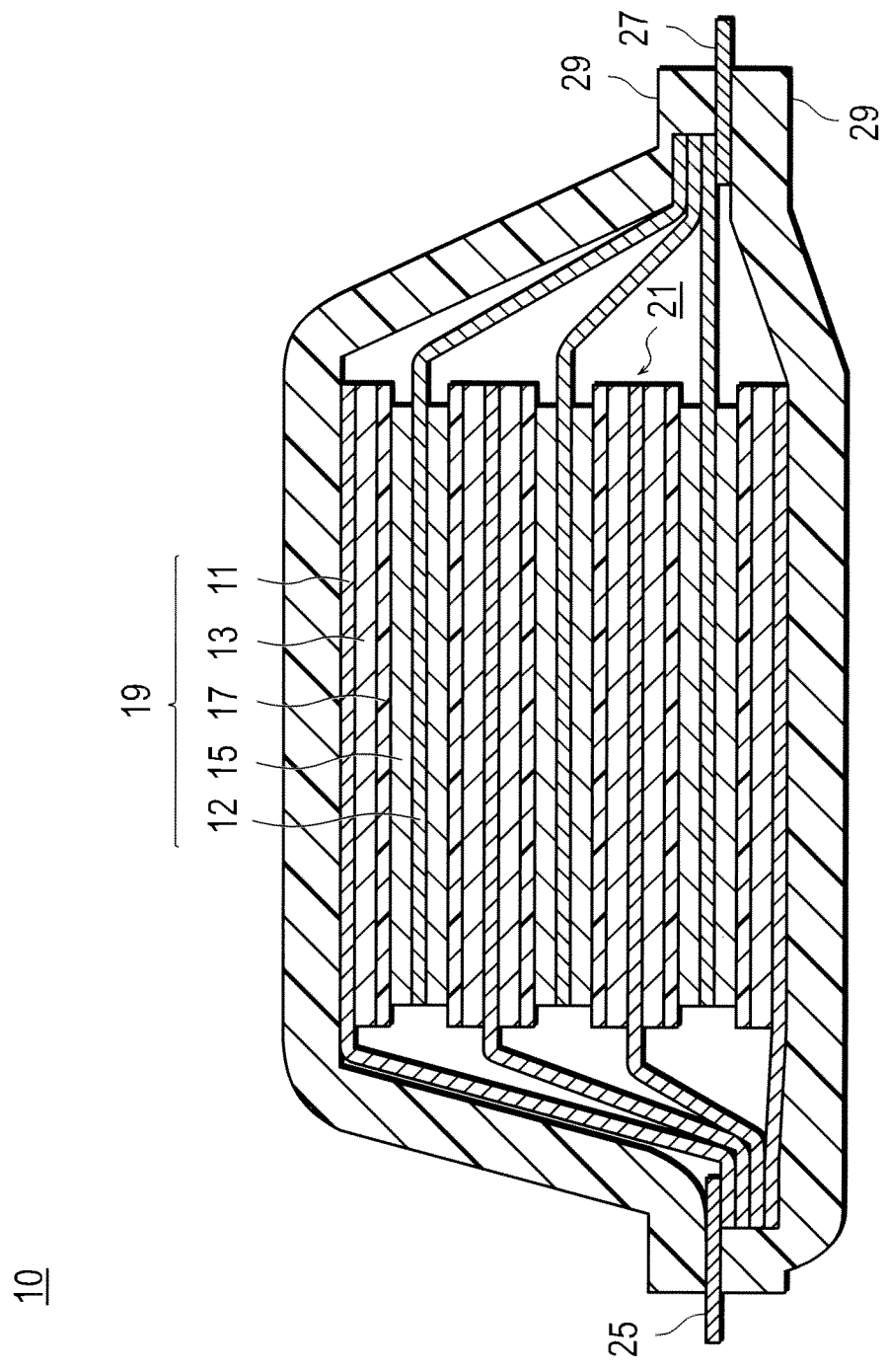
FIG. 1 is a schematic drawing to illustrate the basic constitution of a flat (stack type) and a non-bipolar type lithium ion secondary battery of an embodiment of the invention.

A typical embodiment of the invention is a positive electrode material for an electrical device, which is represented by the formula (1):

[Chemical Formula 2]

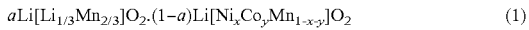

$$aLi[Li_{1/3}Mn_{2/3}]O_2 \cdot (1-a)Li[Ni_xCo_yMn_{1-x-y}]O_2 \quad (1)$$

(wherein, $0<a<1$, $0<x<0.5$, and $0<y<0.3$) and satisfies the relational expression: $2x+y<1$.

A positive electrode material for a so called solid solution base that is represented by the formula: $aLi[Li_{1/3}Mn_{2/3}]O_2 \cdot (1-a)LiMO_2$ (in the formula, M represents a transition metal and $0<a<1$) is expected to be used as a high capacity material. Preferred examples of M include at least one transition metal having average oxidation state of +3. Ni, Co, Mn or the like are used, for example. The term "average oxidation state" represents the average oxidation state of metals for constituting M, and it is calculated from molar amount and atomic valance of the constitutional metals. For example, when M is constituted by 50% of Ni (II) and 50% of Mn (IV) on the molar basis, the average oxidation state of M is as follows: $(0.5) \cdot (+2) + (0.5) \cdot (+4) = +3$.

Specifically, as disclosed in Patent Document 1, studies have been examined regarding a solid solution composed of $Li_2MnO_3$, and, $Li[Ni_{0.5}Mn_{0.5}]O_2$, $Li[Ni_{1/3}Co_{1/3}Mn_{1/3}]O_2$, $LiCoO_2$, or the like. In addition, since $Li[Li_{1/3}Mn_{2/3}]O_2$ can be also described as $Li_2MnO_3$, in the present specification, the solid solution represented by the formula: $aLi[Li_{1/3}Mn_{2/3}]O_2 \cdot (1-a)LiMO_2$ is also referred to as $Li_2MnO_3$—$LiMO_2$ based solid solution. Herein, when Ni and Mn are contained as M in the $Li_2MnO_3$—$LiMO_2$ based solid solution as a positive electrode material, it is generally known that the composition ratio (mole fraction ratio) between Ni and Mn in $LiMO_2$ part is preferably 1:1. This is based on the idea that, in a $LiMO_2$ based solid solution in which Ni and Mn are contained as M, high capacity can be obtained when the composition ratio between Ni and Mn is 1:1. According to a $LiMO_2$ solid solution which contains layer type $LiMO_2$, Mn (IV) skeleton can be synthesized even in an air, and therefore the atomic valence is not changed even by charge and discharge. For such reasons, it is believed that Ni (II)-Mn (IV) is stabilized when the composition ratio between Ni and Mn is prepared to be 1:1.

However, the positive electrode material containing a $Li_2MnO_3$—$LiMO_2$ based solid solution in which the composition ratio between Ni and Mn in $LiMO_2$ part is 1:1 has a problem that, although it has large capacity, the initial irreversible capacity thereof is huge and the capacity of a negative electrode active material is significantly lost.

According to the positive electrode material of this embodiment, however, the composition ratio of Mn (molar ratio) is higher than the composition ratio of Ni (molar ratio) in $LiMO_2$ part of the $Li_2MnO_3$—$LiMO_2$ based solid solution. Specifically, the relational expression: $2x+y<1$ in the above formula (1) is satisfied. By such composition, the problems mentioned above are solved so that not only the initial irreversible capacity can be improved but also a positive electrode material having high capacity can be provided. In addition, by using the positive electrode material for an electrical device of this embodiment as a main active material of a positive electrode for an electrical device like lithium ion battery, a battery with high energy density can be obtained.

Specific reasons for having a reduction in irreversible capacity and an increase in capacity by having larger mole fraction of Mn compared to mole fraction of Ni in $LiMO_2$ part remain unclear. However, it is believed that, by having system-stabilizing $Li_2MnO_3$ component, degree of freedom in $LiMO_2$ part increases. Further, by having larger mole fraction of Mn compared to mole fraction of Ni, Mn in $LiMO_2$ part has a mixed atomic valence state of Mn (IV) and Mn (III), and therefore electric conductivity of a solid solution is improved and also the reactivity is enhanced. In this connection, it is supposed that lithiums are easily released from a solid solution to inhibit a dissociation reaction, and as a result, the irreversible capacity is lowered. It is also supposed that, as the electrochemical reaction of a solid solution is activated, an oxidation reduction reaction is promoted so that available capacity increases and high capacity is obtained consequently. However, the invention is not limited to the embodiments in which properties of the material are improved by the mechanism described.

Herein below, preferred embodiments of the invention are described in view of the figures. However, the invention is not limited to the embodiments given below. Further, for explanation of the figures, the same symbols are given to the same elements and the same explanations are not repeated. Further, dimension ratio is exaggerated in the figures for the sake of explanation, and it may be different from real ratio.

First, the basic constitution of an electrical device to which the positive electrode material of the embodiment can be applied is described in view of the figures. In the present embodiment, a lithium ion battery is exemplified and explained as an electrical device.

[Overall Structure of Battery]

According to the invention, it would be sufficient for the lithium ion battery that it used the positive electrode material for an electrical device of the embodiment, and therefore other constitutional requirements are not specifically limited.

For example, when the lithium ion battery is categorized according to shape and structure, any known shape or structure can be employed including stack type (flat type) battery and winding type (barrel type) battery. By adopting a stack type (flat type) battery structure, long-term reliability can be ensured by a sealing process like simple thermo-compression, and thus it is advantageous from the viewpoint of cost and workability.

In terms of electrical connection in a lithium ion battery (i.e., electrode structure), it can be applied to any one of a non-bipolar (i.e., internal parallel connection type) electrode and a bipolar (i.e., internal series connection type). In the non-bipolar electrode, a positive electrode active material or a negative electrode active material using a binder or the like is applied on a collector for positive electrode or negative electrode to constitute an electrode (positive electrode or negative electrode). In the case of a bipolar electrode, a positive electrode active material is applied on one surface of a collector and a negative electrode active material is applied on the other surface of a collector and the positive electrode active material and negative electrode active material layers are stacked to constitute a bipolar type electrode.

In the descriptions given below, a non-bipolar (internal parallel connection type) lithium ion secondary battery consisting of a positive electrode material for an electrical device is described as a typical embodiment of the invention. However, it is an evident that the technical scope of the invention is not limited to the modes given below.

FIG. 1 is a schematic drawing to illustrate the basic constitution of a flat (stack type) and non-bipolar lithium ion secondary battery as one embodiment of the invention (herein below, also simply referred to as a "stack type battery"). As shown in FIG. 1, the stack type battery 10 of this embodiment has a structure in which a electric power generating element 21 having a substantially rectangular shape, in which actual charge-discharge reaction occurs, is sealed in an inside of a laminate sheet 29 as a package. Here, the electric power generating element 21 has a constitution in which a negative electrode active material layer 13 formed on both surfaces of the negative electrode collector 11, the electrolyte layer 17, and a positive electrode active material layer 15 formed on both surface of the positive electrode collector 12 are stacked. Specifically, single negative electrode active material layer 13 and the adjacent positive electrode active material layer 15 are stacked so that they can face to each other while interposing the electrolyte layer 17 therebetween, and as a result, the negative electrode, the electrolyte layer, and the positive electrode are stacked in the order.

Accordingly, the adjacent negative electrode, the electrolyte layer, and the positive electrode compose one unit battery layer 19. Hence, it can also be described that the stack type battery 10 of the present embodiment has a configuration of electrical parallel connection formed by stacking plural unit battery layers 19. Moreover, in the outermost negative electrode collector located on the outermost layers of the electric power generating element 21, the negative electrode active material layer 13 is formed only on one surface of each thereof. However, the active material layer may be also formed on both surfaces. In other words, in addition to a collector with an active layer formed on a single surface that is exclusively used for the outermost layer, a collector with an active layer formed on both surfaces may be used itself as a collector for the outermost layer. It is also possible that, by reversing the arrangement of the positive electrode and the negative electrode of FIG. 1 to have the outermost layer positive electrode collector formed on both outermost layers of the electric power generating element 21, the positive electrode active material layer is formed on a single surface or both surfaces of the outermost layer positive electrode collector.

Each of the negative electrode collector 11 and the positive electrode collector 12 is connected to the negative electrode collector plate 25 and the positive electrode collector plate 27 connected to each electrode (negative electrode and positive electrode), respectively, is provided like an insertion to the end of the laminate sheet 29 so that it is protruded from the laminate sheet 29. If necessary, each of the negative electrode collector plate 25 and the positive electrode collector plate 27 may be also provided on the negative electrode collector 11 and the positive electrode collector 12 of each electrode via a negative electrode lead and a positive electrode lead (not illustrated) by ultrasonic welding or resistance welding.

Herein below, members constituting the battery of the present embodiment are described in greater detail.

(Positive Electrode Material for Electrical Device)

The main active material of the positive electrode (positive electrode active material layer) according to the invention is characterized in that it is a positive electrode material for an electrical device which is represented by the general formula (1):

[Chemical Formula 3]

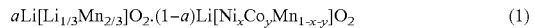

$$aLi[Li_{1/3}Mn_{2/3}]O_2 \cdot (1-a)Li[Ni_xCo_yMn_{1-x-y}]O_2 \quad (1)$$

(wherein, $0<a<1$, $0<x<0.5$, and $0<y<0.3$) satisfies the relational expression: $2x+y<1$.

The positive electrode material of the present embodiment has a space group of C2/m (i.e., a monoclinic structure) at least in initial state. Such structure can be confirmed by electron beam diffraction or X ray diffraction (e.g., broad peak at 2θ of 20-25°) of the active material.

Figure 2:
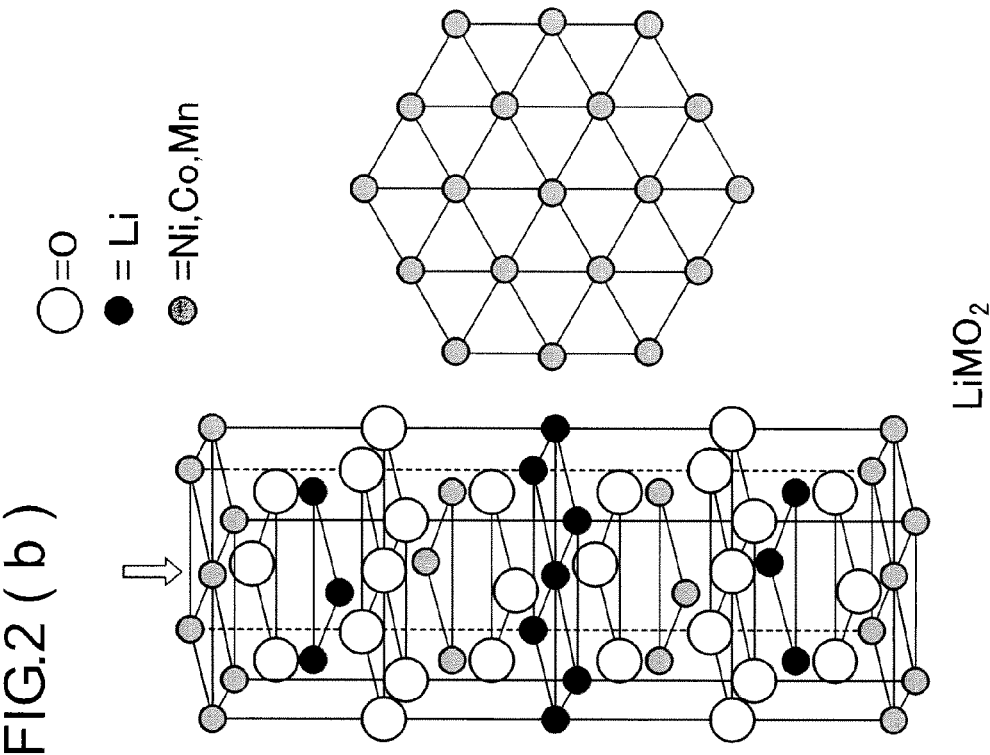
FIG. 2 is a schematic drawing to illustrate a relation between crystal structures of $Li[Li_{1/3}Mn_{2/3}]O_2$ (a) and $LiMO_2$ (b).
Figure 2:
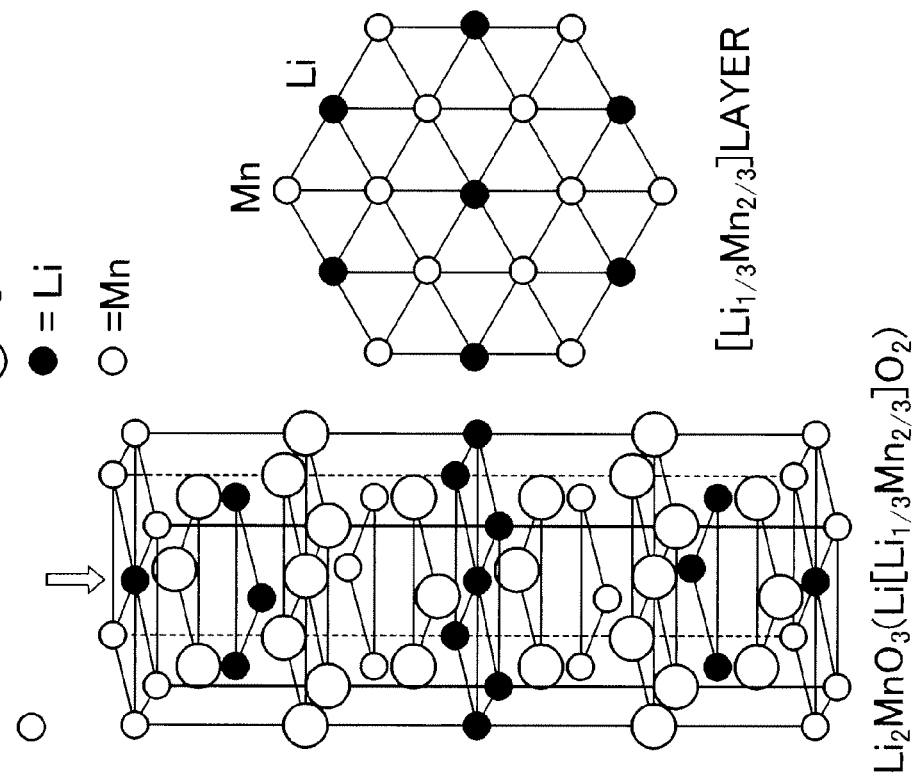

FIG. 2 is a schematic drawing to illustrate a relationship between crystal structures of $Li[Li_{1/3}Mn_{2/3}]O_2$ (a) and $LiMO_2$ (b). In FIG. 2(a) and FIG. 2(b), the drawings on the right side illustrate the arrangement of atoms and the adjacent lattice atoms of the structures on the left side, when they are seen in the direction of the arrow. As illustrated in FIG. 2(a), the crystal structure of $Li[Li_{1/3}Mn_{2/3}]O_2$ includes a metal layer consisting of a transition metal (Mn) and lithium (Li). In the metal layer, lithium is orderly arranged for every three atoms in the directions of axis a and axis b to form a two dimensional plane.

Li,Mn,Mn,Li,Mn,Mn, [Chemical Formula 4]

Lithiums (Li) that are orderly arranged in the metal layer originate from $Li_{1/3}$ of $[Li_{1/3}Mn_{2/3}]O_2$. The periodic arrangement structure of lithium can be confirmed from the electron beam diffraction data.

Meanwhile, the 3-fold periodic arrangement of lithium in a metal layer is not found from the crystal structure of $LiMO_2$.

In the above general formula (1), a is a number which satisfies the relational expression of $0<a<1$. Preferably, it satisfies $0.40 \leq a \leq 0.80$, more preferably $0.50 \leq a \leq 0.70$, still more preferably $0.60 \leq a \leq 0.70$. When a is the same or greater than 0.40, the ratio of component $Li_2MnO_3$ in the crystal increases and exhibits high capacity. When a is the same or less than 0.80, a sufficient reactivity is obtained and gives high capacity. Since the mechanism for charge and discharge reaction is not fully understood, it is unclear exactly how much amount of lithium can be used. Nevertheless, the reason for expecting high capacity by having a large amount of $Li_2MnO_3$ component in the crystal is believed that, if all the lithiums in the lithium layer within the crystal can contribute to reversible capacity, capacity of 344 mAh/g is obtained, and if all Li in the composition formula can contribute to reversible capacity, significantly high capacity of 459 mAh/g is obtained. On the other hand, only 275 mAh/g is expected as theoretical capacity from $LiMO_2$.

In the above formula (1), y is required only to satisfy $0<y<0.3$. Although it is supposed that the electric conductivity is improved by adding Co to easily obtain high capacity, from the viewpoint of availability of resources and cost, it is preferable that $y<0.3$. Preferably, it satisfies the relational expression of $0.1 \leq y \leq 0.2$. When $0<(1-a)y<0.07$ is satisfied, favorable effect of obtaining high capacity is significant while inhibiting cost increase.

The method of producing the positive electrode material which is represented by the formula (1): $aLi[Li_{1/3}Mn_{2/3}]O_2 \cdot (1-a)Li[Ni_xCo_yMn_{1-x-y}]O_2$ and satisfies the relational expression of $2x+y<1$ is not specifically limited, and the material can be produced by appropriately using a conventionally known method. For example, it can be carried out as follows by using a spray drying method given below as described in the after-mentioned Examples.

A pre-determined amount of acetate (metal) salt, nitrate (metal) salt or the like of Li, Mn, Ni, and Co as a starting material is weighed and added with citric acid in the same molar amount as the (metal) salt to prepare a solution. Examples of the acetate (metal) salt and nitrate (metal) salt of Li, Mn, Ni, and Co include lithium acetate, nickel acetate, cobalt acetate, manganese acetate, titan acetate, zirconium acetate, aluminum acetate, gallium acetate, indium acetate, and boron nitrate, but not limited thereto. Subsequently, the solution is transformed into powder by the spray drying and subjected to heat treatment (temporary calcination) to give a precursor. The heat treatment is preferably carried out for 5 to 10 hours at 359 to 500° C. under atmospheric condition. However, it is not limited to the specified range. The precursor obtained by heat treatment is calcined (main calcination) by keeping it at 850 to 1000° C. for 3 to 20 hours under atmospheric condition to produce a solid solution represented by the above formula. After calcination, it is preferable to perform rapid cooling (quenching) by using liquid nitrogen or the like from the viewpoint of reactivity and stability of cycle.

The identification of a solid solution can be carried out by electronic beam diffraction, X ray diffraction (XRD), or inductively coupled plasma (ICP) elemental analysis.

It is preferable that the positive electrode material for an electrical device is treated by oxidation treatment. The method of oxidation treatment is not specifically limited, and examples thereof include the following oxidation treatments:

(1) Charge or charge-discharge in a predetermined potential range, specifically, charge or charge-discharge in a low potential region which does not cause a significant change in crystal structure of a solid solution positive electrode in the initial state;
(2) Oxidation with an oxidizing agent which corresponds to charge (e.g., halogen like fluorine and chlorine); and
(3) Oxidation using a redox mediator.

As an example of the oxidation treatment (1) above, although not specifically limited, charge or charge-discharge at electric potential which is not higher than the pre-determined maximum electric potential (i.e., charge-discharge pre-treatment with controlled electric potential) with constituting a battery, an electrode or an electrode-like is effective. As a result, a positive electrode material for an electrical device having high capacity and good cycle durability, and for example, a battery with high energy density using the positive electrode material can be produced.

Regarding the charge-discharge pre-treatment with controlled electric potential, it is preferable that 1 to 30 cycles of charge-discharge is carried out under the condition such that the maximum electric potential in the pre-determined electric potential range with respect to the lithium metal counter electrode (i.e., upper limit of the electric potential for charge-discharge with lithium metal or in terms of lithium metal) is preferably 3.9 V or more but less than 4.6 V, and more preferably 4.4 V or more but less than 4.6 V. By the oxidation treatment of charge-discharge within the range above, a positive electrode for an electrical device having high capacity and good cycle durability, in particular, a battery with high energy density can be produced. When charge or charge-discharge is carried out with maximum electric potential of 4.8 V or so to obtain high capacity after the oxidation treatment (i.e., charge-discharge pre-treatment with controlled electric potential), an effect like significant cycle durability can be effectively exhibited. For such case, it is preferable from the viewpoint of improving durability that the upper limit of electric potential is slowly (i.e., gradually) increased after the charge-discharge is performed at pre-determined initial upper limit potential. The electric potential of lithium metal or electric potential in terms of lithium metal indicates the electric potential which is based on the electric potential exhibited by lithium metal in an electrolyte liquid containing 1 mole of dissolved lithium ions.

After performing 1 to 30 cycles of charge-discharge in the pre-determined electric potential range with respect to the lithium metal counter electrode, it is preferable that the maximum electric potential of the pre-determined electric potential range for charge-discharge is gradually increased. In particular, by gradually increasing the maximum electric potential of charge-discharge electric potential for oxidation treatment when capacity at high potential like 4.7 V, 4.8 V vs. Li is used (use of high capacity), durability of an electrode can be improved even for a short-term oxidation treatment (i.e., the charge-discharge pre-treatment).

The number of cycles required for charge-discharge at each step is not specifically limited when the maximum electric potential (upper limit potential) in the pre-determined electric potential for charge-discharge is gradually increased. However, the range of 1 to 10 cycles is effective. The number of total cycles of charge-discharge for oxidation treatment (i.e., sum of the cycles that are required for charge-discharge at each step) is not specifically limited when the maximum electric potential (upper limit potential) of the pre-determined electric potential for charge-discharge is gradually increased. However, the range of 4 to 20 cycles is effective.

The increase amount (elevation value) of each step is not specifically limited when the maximum electric potential (upper limit potential) of the pre-determined electric potential for charge-discharge is gradually increased. However, 0.05 V to 0.1 V is effective.

The ultimate maximum electric potential (maximum electric potential at the end) for gradually increasing the maximum electric potential (upper limit potential) of the pre-determined electric potential range for charge-discharge is effective for the range 4.6 V to 4.9 V. However, the range is not limited, and the oxidation treatment can be carried out at even higher maximum electric potential at the end if the effect described above is obtained (i.e., charge-discharge pre-treatment with controlled electric potential).

The minimum electric potential of the pre-determined electric potential range is not specifically limited. It is preferably 2 V or more but less than 3.5 V, and more preferably 2 V or more but less than 3 V with respect to the lithium metal counter electrode. By the oxidation treatment of charge or charge-discharge within the above range (i.e., charge-discharge pre-treatment with controlled electric potential), a positive electrode for an electrical device having high capacity and good cycle durability and a battery with high energy density can be produced. Meanwhile, the electric potential (V) for charge-discharge represents electric potential per unit battery (unit cell).

Temperature of the electrode (material) for charge-discharge as the oxidation treatment (i.e., charge-discharge pre-treatment with controlled electric potential) can be selected from the range in which the working effect of the invention is not impaired. From the economic point of view, it is preferably carried out at room temperature which does not require any particular heating or cooling. Meanwhile, from the viewpoint of exhibiting higher capacity and improving cycle durability by short-term charge-discharge treatment, it is preferably carried out at the temperature which is higher than room temperature.

The process (timing) for applying the oxidation treatment (i.e., charge-discharge pre-treatment with controlled electric potential) is not specifically limited. For example, the oxidation treatment can be performed after constituting a battery or after having an electrode or electrode-like constitution. Specifically, it can be applied for the positive electrode active material in powder state, or, after constituting an electrode, or after constituting a battery by assembling with a negative electrode. When the application to a battery, the oxidation treatment (i.e., charge-discharge pre-treatment with controlled electric potential) can be carried out by applying a certain condition by considering an electric potential profile of the electric capacity of a negative electrode to be assembled. An application after constituting a battery is favored over an application to each electrode or electrode-like constitution, since only one oxidation treatment would be enough for oxidation of many electrodes. Meanwhile, an application to each electrode or electrode-like constitution is favorable in that not only the conditions like oxidation potential can be easily controlled but also only little variation in oxidation level can occur in each electrode compared to a case in which a battery is already constituted.

The oxidizing agent used for the above oxidation treatment (2) is not specifically limited, and examples thereof include a halogen such as fluorine and chlorine. The oxidizing agent may be used either singly or in combination of two or more. The oxidation with the use of an oxidizing agent can be carried out, for example, by dispersing particles of a solid solution in a solvent that doesn't dissolve the positive electrode material of the solid solution, and adding and dissolving the oxidizing agent in the dispersion to achieve gradual oxidation.

The descriptions given above are related to constitutional elements that are characteristic to the lithium ion battery of the present embodiment, and other constitutional elements are not specifically limited. Herein below, constitutional elements in addition to the characteristic constitutional element of the lithium ion battery of the invention are described with reference to each constitutional element of the stack type battery 10 described above. However, it is needless to say that the same constitutional elements can be used for a battery other than a stack type battery, for example, a bipolar battery.

[Collector]

As a collector (the negative electrode collector 11 and the positive electrode collector 12), any member conventionally used as a collector material for a battery can be appropriately used. Examples of the positive electrode collector and the negative electrode collector include aluminum, nickel, iron, stainless steel (SUS), titanium, and copper. Of these, from the viewpoint of electron conductivity and battery operating potential, aluminum is preferable as the positive electrode collector and copper is preferable as the negative electrode collector. Thickness of the collector is generally 10 to 20 μm. However, the collector having a thickness outside the range can be also used. The collector plate can be also formed with the same material as the collector.

[Active Material Layer]

The active material layer (the negative electrode active material layer 13 and the positive electrode active material layer 15) is composed of an active material (a negative electrode active material, a positive electrode active material, and a reference electrode active material). The active material layer may also contain, if necessary, a binder, a conductive agent for enhancing electric conductivity, an electrolyte (polymer matrix, ion conductive polymer, and electrolyte liquid), and salts for supporting electrolyte (i.e., lithium salt) to enhance ion conductivity.

(a) Active Material

Materials (substances) for the positive electrode active material and the negative electrode active material is not specifically limited if it satisfies the requirements of the lithium ion battery of the invention, and it may be appropriately selected depending on each battery type.

Specifically, as a positive electrode active material, the positive electrode material for an electrical device of the present embodiment is used as a major active material of a positive electrode. As for the positive electrode material, the positive electrode material described may be used either singly or in combination of other known positive electrode active material, if necessary. To obtain significant effect of the invention, the positive electrode material is contained in the active material in an amount of preferably 50% by weight or more, more preferably 80% by weight or more, and still more preferably 90% by weight or more.

The negative electrode active material is not specifically limited as long as it can reversibly absorb and release lithium, and any negative electrode active material well known in the field can be used. Examples of the negative electrode active material that can be used include a carbon material like high crystalline carbon graphite (natural graphite, artificial graphite or the like), low crystalline carbon (soft carbon and hard carbon), carbon black (Ketjen Black, acetylene black, channel black, lamp black, oil furnace black, thermal black, or the like), carbon materials such as fullerene, carbon nanotube, carbon nanofiber, carbon nanohorn, and carbon fibrils; a single body element which can form an alloy with lithium such as Si, Ge, Sn, Pb, Al, In, Zn, H, Ca, Sr, Ba, Ru, Rh, Ir, Pd, Pt, Ag, Au, Cd, Hg, Ga, Tl, C, N, Sb, Bi, O, S, Se, Te, and Cl, oxides containing the element (silicon monooxide (SiO), $SiO_x$ (0<x<2), tin dioxide ($SnO_2$), $SnO_x$ (0<x<2), $SnSiO_3$ or the like), and carbonized products (silicon carbide (SiC) or the like); a metallic material such as lithium metal; a lithium-transition metal composite oxide such as lithium-titanium composite oxide (lithium titanate: $Li_4Ti_5O_{12}$), and; other known negative electrode active material. The negative electrode active material may be used either singly or as a mixture of two or more. Examples of the negative electrode material that is particularly preferred for producing a high capacity battery include high crystalline graphite which has high alignment, charge-discharge capacity close to the theoretical capacity of 372 mAh/g, and small initial irreversible capacity.

The average particle diameter of each active material included in each active material layer (13 and 15) is not specifically limited. However, from the viewpoint of obtaining high capacity, reactivity, and cycle durability, it is generally 0.1 to 100 μm, and preferably 1 to 20 μm.

The ratio of the components included in each active material layer (13 and 15) is not specifically limited, and it can be appropriately adjusted in view of the knowledge regarding a lithium ion secondary battery or a lithium ion battery. The thickness of the active material layer is not specifically limited, either, and it can be appropriately adjusted in view of the knowledge regarding a lithium ion secondary battery or a lithium ion battery. The thickness of the active material layer is 2 to 100 μm, for example.

(b) Binder

A binder is added to maintain the electrode structure of a battery by adhering active materials or an active material to a collector.

Examples of the binder include a thermoplastic resin like polyvinylidene fluoride (PVDF), polytetrafluoroethylene (PTFE), polyvinyl acetate, polyimide (PI), polyamide (PA), polyvinyl chloride (PVC), polymethyl acrylate (PMA), polymethyl methacrylate (PMMA), polyether nitrile (PEN), polyethylene (PE), polypropylene (PP), and polyacrylonitrile (PAN), a thermosetting resin such as an epoxy resin, a polyurethane resin, and a urea resin, and a rubber material such as styrene butadiene rubber (SBR).

(c) Conductive Agent

The conductive agent refers to a conductive additive blended for enhancing conductivity. The conductive agent that can be used in the present embodiment is not specifically limited and any conductive agent known in the field can be used. Examples thereof include carbon materials such as carbon black including acetylene black and the like, graphite, and carbon fiber. When the active material layer contains the conductive agent, electron networks in the insides of the active material layers are formed effectively, whereby the conductive agent can contribute to enhancement of output characteristics of the battery and enhancement of reliability based on increased liquid retention of an electrolyte liquid.

(d) Electrolyte

As an electrolyte, a liquid electrolyte, a gel polymer electrolyte, and an genuine polymer electrolyte that are described the [Electrolyte layer] section below can be used without any specific limitation. Specific form of the liquid electrolyte, the gel polymer electrolyte, and the genuine polymer electrolyte will be described in the following (Electrolyte layer) section, and thus no detailed descriptions are given herein. The electrolyte may be used either singly or in combination of two or more. An electrolyte which is the same as or different from the electrolyte used for an electrolyte layer as described below can be used.

[Electrolyte Layer]

The electrolyte layer is a layer containing a non-aqueous electrolyte. The non-aqueous electrolyte contained in an electrolyte layer (specifically, the lithium salt) has a function as carriers of lithium ions which move between the positive electrode and the negative electrode at the time of the charge-discharge. The non-aqueous electrolyte is not specifically limited as long as it can exhibit such activity, and examples thereof that can be used include a liquid electrolyte and a polymer electrolyte.

The liquid electrolyte contains a lithium salt as a supporting salt dissolved in an organic solvent as a plasticizer. Examples of the organic solvent that can be used as the plasticizer include carbonates such as ethylene carbonate (EC), propylene carbonate (PC), dimethyl carbonate (DMC), diethyl carbonate (DEC), and the like. The supporting salt (lithium salt) can employ a compound, such as $Li(CF_3SO_2)_2N$, $Li(C_2F_5SO_2)_2N$, $LiPF_6$, $LiBF_4$, $LiAsF_6$, $LiTaF_6$, $LiClO_4$, $LiCF_3SO_3$ and the like, which can be added to the active material layer of the electrode.

Meanwhile, the polymer electrolyte is categorized into the gel polymer electrolyte (gel electrolyte) which contains an electrolyte liquid, and a genuine polymer electrolyte which does not contain an electrolyte liquid.

The gel polymer electrolyte is formed by injecting the liquid electrolyte into a matrix polymer (host polymer) including an ion conductive polymer. By using the gel polymer electrolyte as an electrolyte, fluidity of the electrolyte vanishes, thereby, it is favorable in that the ion conductivity between the layers can be easily prevented. Examples of the ion conductive polymer used as the matrix polymer (host polymer) include, however are not limited to, polyethylene oxides (PEO), polypropylene oxides (PPO), polyvinylidene fluoride (PVDF), a copolymer of polyvinylidene fluoride and hexafluoropropylene (PVDF-HFP), polyethylene glycol (PEG), polyacrylonitrile (PAN), polymethyl methacrylate (PMMA) and copolymers thereof. Herein, the ion conductive polymer may be either the same as or different from the ion conductive polymer used as an electrolyte of an active material layer. A polymer which is the same as the polymer of the active material layer is preferable. Kind of the electrolyte liquid (electrolyte salt and plasticizer) is not specifically limited, and the electrolyte salts like lithium salts and plasticizes like carbonates as described in the above can be used.

The genuine polymer electrolyte has a constitution where a supporting salt, such as lithium salt, is dissolved in the matrix polymer and does not contain an organic solvent as the plasticizer. Thus, when the electrolyte is formed of the genuine polymer electrolyte, liquid does not leak from the battery, thereby improving the reliability of the battery.

The matrix polymer of the gel polymer electrolyte or the genuine polymer electrolyte forms a cross-linking structure, thus exhibiting excellent mechanical strength. In order to form the cross-linking structure, polymerization such as thermal polymerization, ultraviolet polymerization, radiation polymerization or electron beam polymerization is carried out on a polymer for forming the polymer electrolyte (e.g., PEO or PPO) by using a suitable polymerization initiator.

The non-aqueous electrolyte that is contained in the electrolyte layer may be used either singly or in combination of two or more.

In the case where the electrolyte layer is composed of liquid electrolyte or gel polymer electrolyte, the separator is used in the electrolyte layer. Specific examples of the separator include finely porous films of polyolefins such as polyethylene and polypropylene.

The thickness of an electrolyte layer is preferably to be as thin as possible from the viewpoint of reducing internal resistance. The thickness of an electrolyte layer is generally 1 to 100 μm, and preferably 5 to 50 μm.

[Package]

Regarding the lithium ion secondary battery, in order to prevent an impact from the outside at using the battery and to prevent an environmental deterioration, it is preferable that the entire battery element be housed in a package. A conventionally known metal can case can be used as a battery package. A bag-shaped case which is made by a laminate film containing aluminum can be also used to cover electric power generating element. As a laminate film, the laminate film having a three layer structure in which a PP layer, an aluminum layer and a nylon layer are laminated in this order can be used, but not specifically limited.

[Appearance of Battery]

Figure 3:
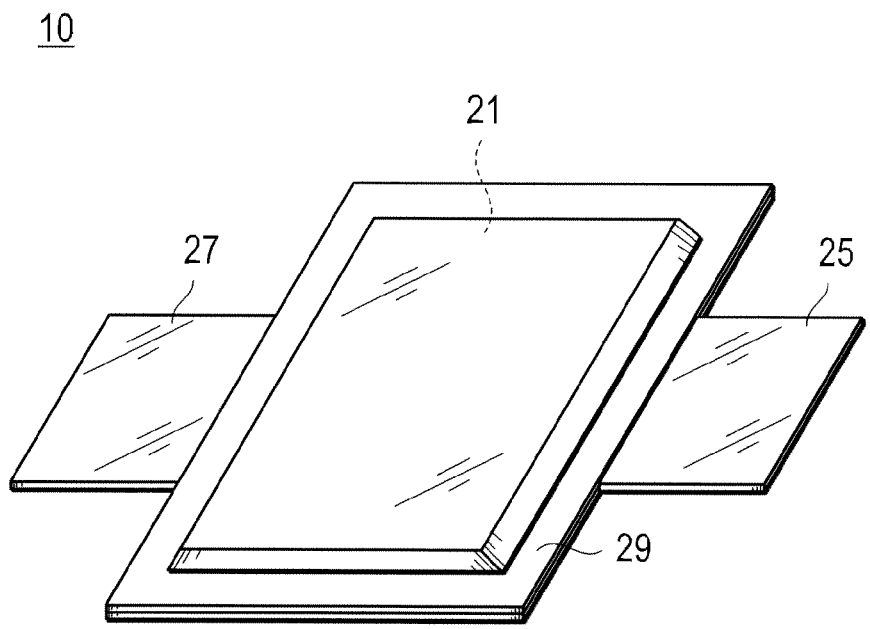
FIG. 3 is a perspective view to illustrate the appearance of the stack type battery of an embodiment of the invention.

FIG. 3 is a perspective view illustrating the appearance of the stack type battery, which is one embodiment of the invention. As illustrated in FIG. 3, the stack type battery 10 has a rectangular flat shape. The negative electrode collector plate 25 and the positive electrode collector plate 27 for electric output are protruded from both lateral sides of the battery. The electric power generating element 21 is enclosed in the battery package 29 of the battery 10 by thermal fusion of an outer peripheral portion of battery package 29. The electric power generating element 21 is sealed while the negative electrode collector plate 25 and the positive electrode collector plate 27 are protruded. Herein, the electric power generating element 21 corresponds to the electric power generating element 21 of the stack type battery 10 illustrated in FIG. 1, in which plural unit battery layer (unit cell) 19 composed of the negative electrode (negative electrode active material layer) 13, the electrolyte layer 17, and the positive electrode (positive electrode active material layer) 15 are stacked.

In the above embodiment of the invention, the lithium ion battery having a flat shape (stack type) as illustrated in FIG. 1 is exemplified as an electrical device, but it is not limited thereto. For a winding type lithium ion battery, it can be of winding cylindrical shape or rectangular flat shape formed by deformation of such cylindrical shape, for example. In the case of the cylindrical battery structure, the package material is not particularly limited and can be a laminate sheet or a conventional cylindrical can (metal can). It can be applied to a secondary battery of other types as wells as a primary battery. It can be also applied to a capacitor in addition to an electrode.

As illustrated in FIG. 3, there is no particular limitation on the lead-out of the collector plate 25 and 27. The negative electrode collector plate 25 and positive electrode collector plate 27 can be led out from the same side, or the negative electrode collector plate 25 and positive electrode collector plate 27 can be divided into plural parts and led out from the respective sides. In the case of the winding type bipolar secondary battery, for example, terminals may be formed using a cylindrical can (metal can) in place of the collector plate.

According to the present embodiment, a positive electrode material having reduced initial irreversible capacity is used as a positive electrode active material, and therefore, the theoretical capacity of the negative electrode active material can be effectively utilized without loss. Consequently, the lithium ion battery with high energy density can be provided. The lithium ion battery according to the present embodiment can be appropriately used as a power source or an auxiliary power source for operating a vehicle which requires high volumetric energy density and high volumetric output density such as a high capacity power source for an electric vehicle, a hybrid electric vehicle, a fuel cell powered vehicle, or a hybrid fuel cell powered vehicle.

EXAMPLES

A description will be made for the effects of the invention by using the following examples and comparative examples. However, it is evident that the technical scope of the invention is not limited to the following examples.

1. Synthesis of Positive Electrode Material Based on Solid Solution

As a starting material, a pre-determined amount of Li, Mn, Ni, and Co acetates were each weighed and added with citric acid in the same molar amount as the (metal) salt to prepare a solution. Subsequently, the solution was transformed into powder by spray drying and subjected to temporary calcination (heating for 10 hours at 450° C. under atmospheric condition) followed by pulverization and forming into pellets to give a precursor. The precursor was subjected to main calcination by keeping it at 900° C. for 12 hours under atmospheric condition followed by rapid cooling in liquid nitrogen for quenching. As a result, each positive electrode material of a solid solution of the Examples 1 to 14 and the Comparative examples 1 to 6 as shown in the Table 1 and 2 was synthesized. In the Table 1, for Examples 1 to 6 and Comparative examples 1 to 6, value of a when composition of the positive electrode material is represented by the formula (1): $aLi[Li_{1/3}Mn_{2/3}]O_2 \cdot (1-a)LiMO_2 = LiM'O_2$, composition and molar ratio relation between Ni and Mn in $LiMO_2$ part ($Li[Ni_xCo_yMn_{1-x-y}]O_2$ part), and molar ratio of Co in M' part are given. In the Table 2, value of a and molar ratio relation between Ni and Mn in $LiMO_2$ part are illustrated for the positive electrode material of the Examples 7 to 14.

Figure 4:
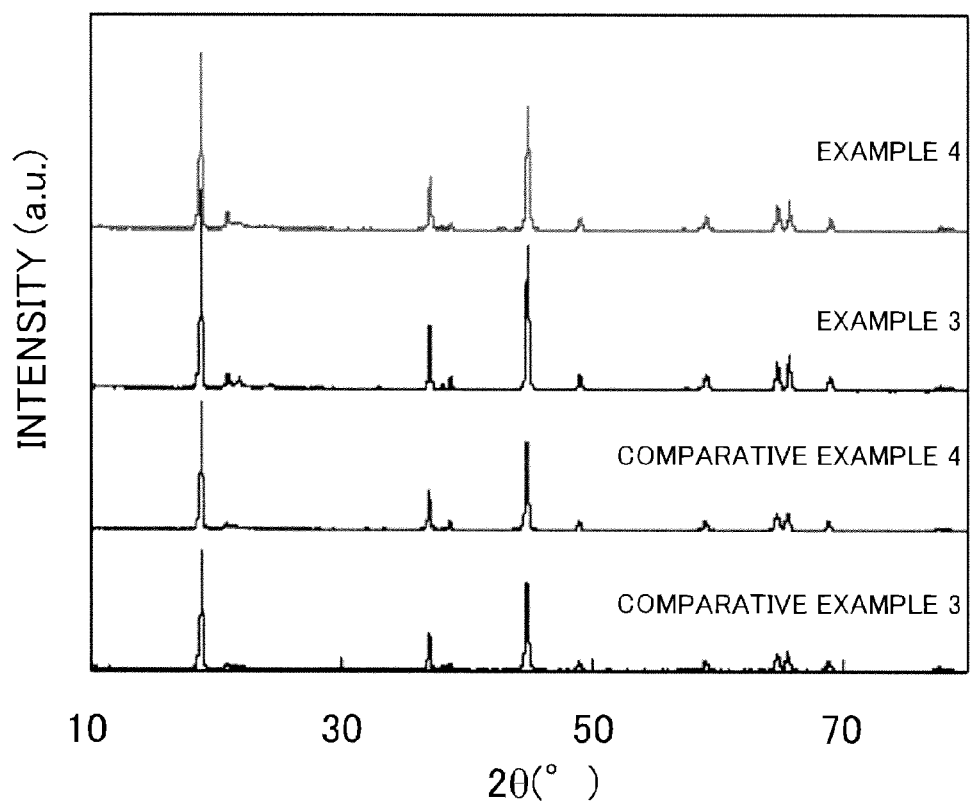
FIG. 4 is X ray diffraction patterns of samples obtained from the Examples 3 and 4 and the Comparative examples 3 and 4.

2. Analysis of Synthesized Samples (1) X ray diffraction (XRD): X ray diffraction was measured for the samples obtained from the Examples 3 and 4 and the Comparative examples 3 and 4 (FIG. 4). All the samples exhibited diffraction lines at 20 to 25° indicating a characteristic superlattice structure. Thus, the space group can be assigned as follows.

$$C2/m$$ [Mathematical Formula 1]

(2) Elemental analysis: The samples obtained from the above were subjected to inductively coupled plasma (ICP) elemental analysis. As a result, it was confirmed that the samples had the composition illustrated in the Table 1 and 2.

3. Evaluation of Positive Electrode Material

By using the positive electrode active materials of the Table 1 and 2, a test cells were prepared according to the following order. First, 20 mg of the positive electrode active material was formed into a pellet of diameter of 15 mm by kneading with using 12 mg of a conductive binder (TAB-2). It was then compressed to a stainless mesh (collector) having the same diameter and dried by heating at 120° C. for 4 hours under vacuum to give a sample electrode (i.e., positive electrode). Herein, a lithium foil (i.e., negative electrode) with diameter of 16 mm was used as a counter electrode and a glass filter was used as a separator to assemble a cell, to which 1 M $LiPF_6$ electrolyte liquid in EC:DMC=1:2 (volume ratio) was added to complete a cell. Thereafter, the charge-discharge property of the cells were evaluated.

Evaluation was made under the test condition including voltage range of 2.0 to 4.8 V, current density of 0.2 mA/cm$^2$ and a room temperature.

Figure 5:
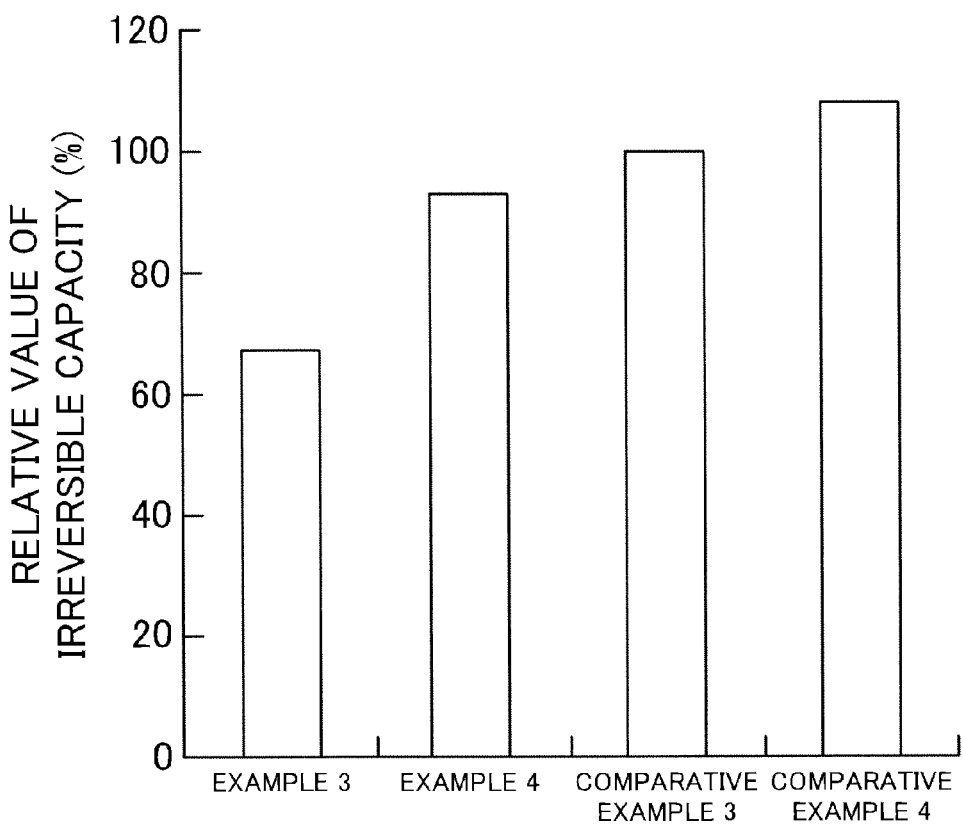
FIG. 5 is a graph to demonstrate the comparison of irreversible capacity of electrodes that are obtained by using the sample of the Examples 3 and 4 and the Comparative examples 3 and 4.

The results obtained are given in the Table 1 and 2. FIG. 5 is a graph to demonstrate the irreversible capacity of positive electrodes that were obtained from the Examples 3 and 4 and the Comparative examples 3 and 4, in which the capacity was given as a relative value with respect to the irreversible capacity of the Comparative example 3, which was set to 100%. As illustrated in the Table 1 and FIG. 5, the initial irreversible capacities of the Examples 3 and 4 were reduced by 33% and 7%, respectively, compared to the Comparative example 3. Meanwhile, the initial irreversible capacity of the Comparative example 4 was increased by 8% compared to the Comparative example 3. In the Comparative example 3 had a composition ($Li[Ni_{0.183}Li_{0.2}Co_{0.033}Mn_{0.583}]O_2$), in which the compositional ratio was the same for Ni and Mn in ($LiMO_2$) part. Composition of the positive electrode material of the Examples 3 and 4 corresponded to ($Li[Ni_{0.0183}Li_{0.2}Co_{0.022}Mn_{0.594}]O_2$) and ($Li[Ni_{0.0183}Li_{0.2}Co_{0.011}Mn_{0.604}]O_2$), respectively. It was found from FIG. 5 that, compared to the Comparative example 3, the first irreversible capacity was decreased in the Examples 3 and 4 in which Mn amount was higher. In the Examples 3 and 4, molar ratios of Mn were higher than molar ratio of Ni in $LiMO_2$ part so that Mn had an atomic valence of not only Mn (IV) but also Mn (III), yielding a mixed valence state. It is supposed that, by such mixed valence state, electrical conductivity was improved and Li was easily released from a solid solution to lower the initial irreversible capacity. It was also found that, compared to the Comparative example 3, the first irreversible capacity was increased in the Comparative example 4 in which Ni content was higher.

Figure 6:
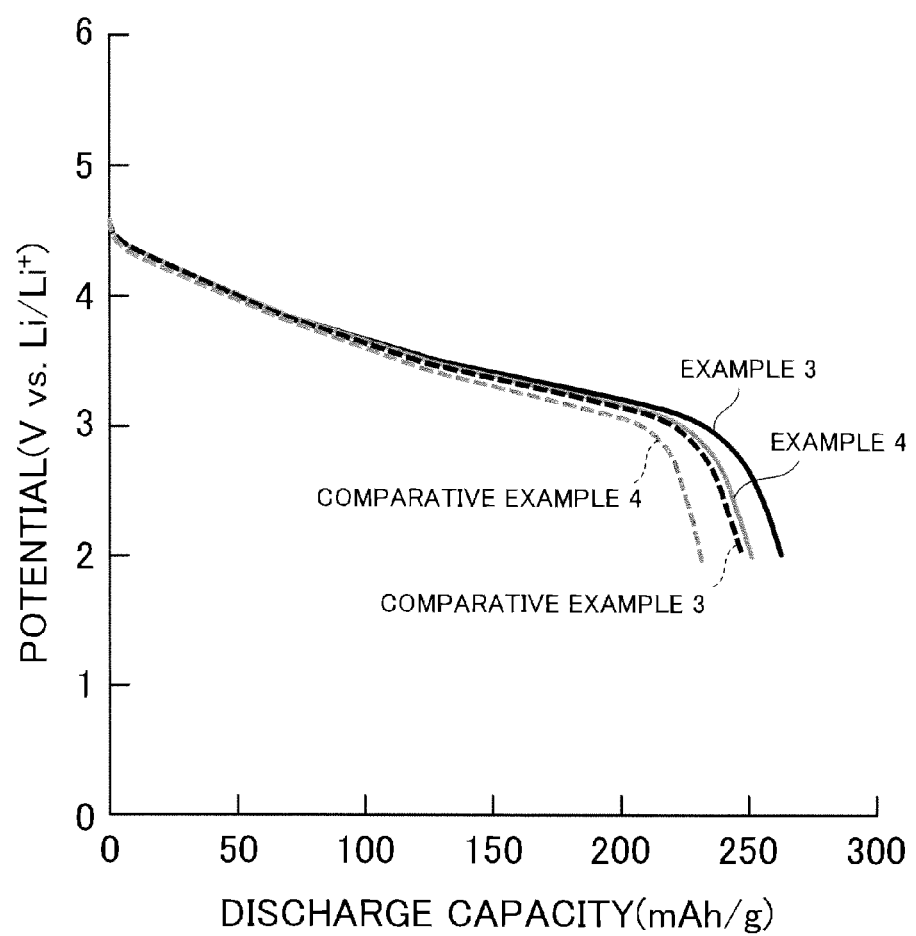
FIG. 6 is a $2^{nd}$ cycle discharge curve of electrodes that are obtained by using the sample of the Examples 3 and 4 and the Comparative examples 3 and 4.

In FIG. 6, the discharge capacity at the second cycle during which the cycle was relatively stabilized was illustrated for the positive electrode material of the Examples 3 and 4 and the Comparative examples 3 and 4. From FIG. 6, it was found that the electrode using the positive electrode active material of the Examples 3 and 4 had higher second discharge capacity compared to the electrode using the positive electrode material of the Comparative example 3. This is supposed due to the fact that, as the Mn in LiMO$_2$ part has a mixed valence state, the electrochemical reaction of a solid solution is activated and the redox reaction can easily occur, and as a result the available capacity is increased. Meanwhile, the Comparative example 4 in which the molar ratio of Ni was higher than the molar ratio of Mn in LiMO$_2$ part showed lower second discharge capacity compared to the Comparative example 3.

Figure 7:
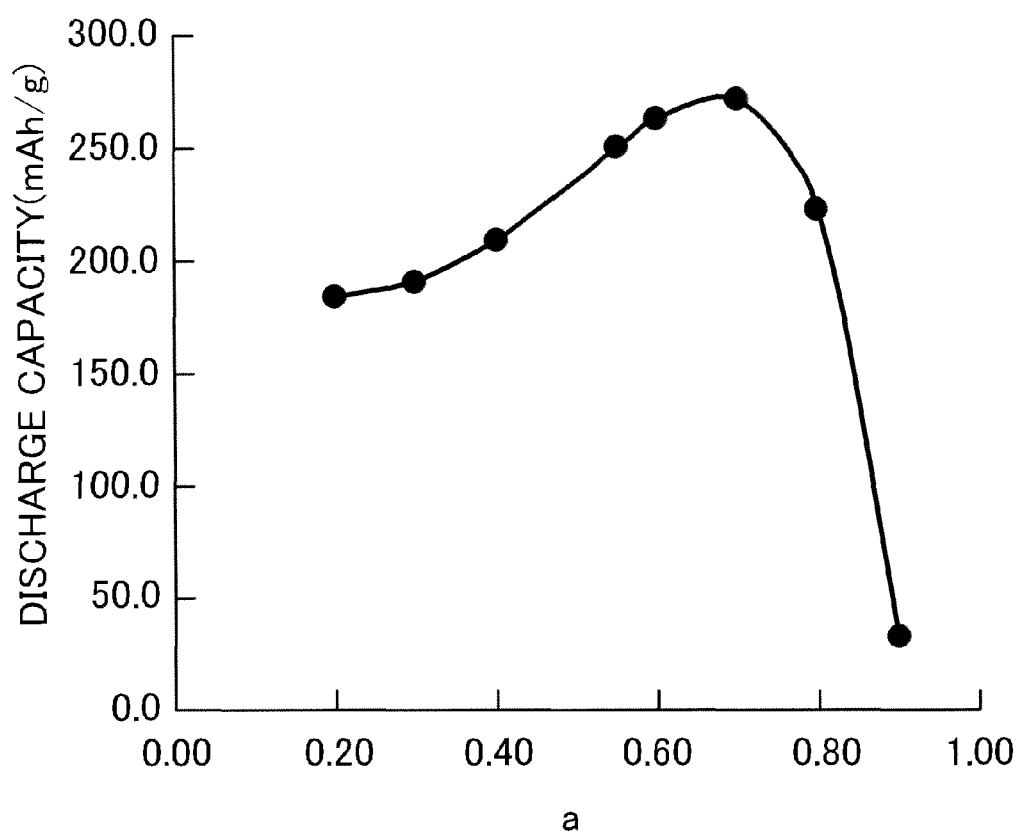
FIG. 7 is a graph to illustrate a change in discharge capacity when value of a in the general formula (1) is varied.

In the Table 2 and FIG. 7, the second discharge capacities were shown for the positive electrode materials of the Examples 7 to 14 when the composition of LiMO$_2$ part was fixed and the value of a was varied, in that case, the materials are represented by the formula (1): aLi[Li$_{1/3}$Mn$_{2/3}$]O$_2$.(1−a)LiMO$_2$. In the Table 2, the Example 11 is the same as the Example 3 of the Table 1.

TABLE 1

| Sample | a | Ni composition in LiMO$_2$ | Co composition in LiMO$_2$ | Mn composition in LiMO$_2$ | [Mn] − [Ni] Difference between Mn and Ni | [Ni] < [Mn] relation in LiMO$_2$ | Co mole fraction ratio in M' | Irreversible capacity (mAh/g) | Discharge capacity (2$^{nd}$) (mAh/g) |
|---|---|---|---|---|---|---|---|---|---|
| Example 1 | 0.40 | 0.417 | 0.149 | 0.434 | 0.017 | ○ | 0.089 | 35.7 | 221.2 |
| Example 2 | 0.40 | 0.417 | 0.134 | 0.449 | 0.032 | ○ | 0.080 | 40.3 | 210.5 |
| Comparative example 1 | 0.40 | 0.417 | 0.166 | 0.417 | 0.000 | x | 0.100 | 46.5 | 195.3 |
| Comparative example 2 | 0.40 | 0.434 | 0.166 | 0.400 | −0.034 | x | 0.100 | 52.1 | 186.7 |
| Example 3 | 0.60 | 0.458 | 0.055 | 0.485 | 0.027 | ○ | 0.022 | 30.1 | 263.1 |
| Example 4 | 0.60 | 0.458 | 0.028 | 0.510 | 0.052 | ○ | 0.011 | 41.7 | 250.5 |
| Comparative example 3 | 0.60 | 0.458 | 0.083 | 0.458 | 0.000 | x | 0.033 | 44.9 | 245.9 |
| Comparative example 4 | 0.60 | 0.485 | 0.055 | 0.458 | −0.027 | x | 0.022 | 48.7 | 232.1 |
| Example 5 | 0.85 | 0.389 | 0.211 | 0.400 | 0.011 | ○ | 0.032 | 15.4 | 102.4 |
| Example 6 | 0.85 | 0.389 | 0.199 | 0.412 | 0.023 | ○ | 0.030 | 18.6 | 07.3 |
| Comparative example 5 | 0.85 | 0.389 | 0.222 | 0.389 | 0.000 | x | 0.033 | 25.1 | 60.5 |
| Comparative example 6 | 0.85 | 0.400 | 0.211 | 0.389 | −0.011 | x | 0.032 | 31.2 | 55.9 |

Even when the positive electrode material of the Comparative example 1, which had a constitution different from the Comparative example 3 but had the same molar ratio of Ni as the molar ratio of Mn in LiMO$_2$ part, was used, high initial irreversible capacity was obtained. From the positive electrode material of the Comparative example 5 in which the molar ratio of Mn was the same as the molar ratio of Ni in LiMO$_2$ part, it was difficult to obtain sufficient capacity. It was found from the results given above that, by using the positive electrode material of the invention in which the molar ratio of Mn is higher than the molar ratio of Ni in LiMO$_2$ part, the initial irreversible capacity can be lowered while the high capacity is maintained.

As shown in the Table 1, the positive electrode material of the Examples 1 and 2 and the Comparative examples 1 and 2 in which values of a, i.e., the content of Li[Li$_{1/3}$Mn$_{2/3}$]O$_2$ part, were 0.40, showed the same tendency as the Examples 3 and 4 and the Comparative examples 3 and 4 in which value of a is 0.6. Thus, in the Examples 1 and 2 in which the molar ratios of Mn were higher than the molar ratio of Ni in LiMO$_2$ part, the initial irreversible capacities were lowered compared to the Comparative example 1, and therefore the second discharge capacities were higher. On the other hand, in the Comparative example 2 in which the molar ratio of Ni was higher, the initial irreversible capacity was big and the second discharge capacity was lowered.

Similarly, with regard to the positive electrode materials of the Examples 5 and 6 and the Comparative examples 5 and 6, in which values of a were 0.85, the Examples 5 and 6 in which the molar ratios of Mn were higher than the molar ratio of Ni in LiMO$_2$ part, showed lower initial irreversible capacities compared to the Comparative example 5, and therefore yielding high second discharge capacities. On the other hand, in the Comparative example 6 in which the molar ratio of Ni was higher, the initial irreversible capacity was big and the second discharge capacity was lowered.

TABLE 2

| Sample | a | Ni composition in LiMO$_2$ | Mn composition in LiMO$_2$ | [Ni] < [Mn] relation in LiMO$_2$ | Discharge capacity (mAh/g) |
|---|---|---|---|---|---|
| Ex. 7 | 0.20 | 0.458 | 0.485 | ○ | 184.6 |
| Ex. 8 | 0.30 | 0.458 | 0.485 | ○ | 190.5 |
| Ex. 9 | 0.40 | 0.458 | 0.485 | ○ | 209.0 |
| Ex. 10 | 0.55 | 0.458 | 0.485 | ○ | 250.4 |
| Ex. 11 | 0.60 | 0.458 | 0.485 | ○ | 263.1 |
| Ex. 12 | 0.70 | 0.458 | 0.485 | ○ | 271.1 |
| Ex. 13 | 0.80 | 0.458 | 0.485 | ○ | 223.2 |
| Ex. 14 | 0.90 | 0.458 | 0.485 | ○ | 33.0 |

From the results of the Table 2 and FIG. 7, it was found that high discharge capacity could be obtained when the positive electrode materials of the Examples 9 to 13, in which the values of a were from 0.40 to 0.80, were used. Among them, particularly high discharge capacity could be obtained from the Examples 10 to 12, in which the values of a were from 0.50 to 0.70.

4. Reference Example

As a reference example, the upper limit of charging potential for the charge-discharge cycle as an oxidation treatment was gradually increased for the positive electrode produced with the positive electrode material of the Example 4 instead of directly charging to 4.8 V for the first charging. Specifically, the first upper limit of charging potential was set to 4.6 V and then the electrode was discharged to 2 V. The same process was repeated twice. After charging to 4.7 V, the electrode was discharged to 2 V. The same process was repeated twice. After charging to 4.8 V, the charge-discharge was repeated within the range of 2.0 to 4.8 V according to a common method. As a result, it was confirmed that capacity of about 275 mAh/g could be stably exhibited.

Taken together, it was found that, by performing a charge-discharge pre-treatment with controlled electric potential for a positive electrode using the positive electrode material of the invention, higher capacity could be stably obtained.

This application is based upon Japanese Patent Application No. 2009-276808 filed on Dec. 4, 2009, of which contents are entirely incorporated herein by reference.

EXPLANATIONS OF LETTERS OR NUMERALS

10: STACK TYPE BATTERY
11: NEGATIVE ELECTRODE COLLECTOR,
12: POSITIVE ELECTRODE COLLECTOR,
13: NEGATIVE ELECTRODE ACTIVE MATERIAL LAYER (NEGATIVE ELECTRODE),
15: POSITIVE ELECTRODE ACTIVE MATERIAL LAYER (POSITIVE ELECTRODE),
17: ELECTROLYTE LAYER
19: UNIT BATTERY LAYER (UNIT CELL)
21: ELECTRIC POWER GENERATING ELEMENT
25: NEGATIVE ELECTRODE COLLECTOR PLATE,
27: POSITIVE ELECTRODE COLLECTOR PLATE,
29: PACKAGE (LAMINATE SHEET).

The invention claimed is:

1. A positive electrode material for an electrical device, which is represented by the formula (1):

$$a\mathrm{Li}[\mathrm{Li}_{1/3}\mathrm{Mn}_{2/3}]\mathrm{O}_2 \cdot (1-a)\mathrm{Li}[\mathrm{Ni}_x\mathrm{Co}_y\mathrm{Mn}_{1-x-y}]\mathrm{O}_2 \qquad (1)$$

(wherein, $0<a<1$, $0<x<0.5$, and $0<y<0.3$) and satisfies the relational expression: $2x+y<1$.

2. The positive electrode material for an electrical device according to claim 1, wherein it further satisfies $0.40 \leq a \leq 0.80$.

3. The positive electrode material for an electrical device according to claim 2, wherein it further satisfies $0.50 \leq a \leq 0.70$.

4. The positive electrode material for an electrical device according to claim 1, wherein it further satisfies the relational expression: $0<(1-a)y<0.07$.

5. An electrical device comprising the positive electrode material for an electrical device according to claim 1 as a positive electrode active material.

6. The electrical device according to claim 5, wherein it is a lithium ion battery.

* * * * *